US012086656B2

(12) United States Patent
Huisman

(10) Patent No.: US 12,086,656 B2
(45) Date of Patent: Sep. 10, 2024

(54) AUTOMATIC GRAPHICS PROCESSING UNIT SELECTION

(71) Applicant: Nutanix, Inc., San Jose, CA (US)

(72) Inventor: Sven Huisman, Blaricum (NL)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/976,635

(22) Filed: Oct. 28, 2022

(65) Prior Publication Data

US 2024/0143415 A1 May 2, 2024

(51) Int. Cl.
*G06F 9/54* (2006.01)
*G06F 9/455* (2018.01)
*G06F 9/50* (2006.01)

(52) U.S. Cl.
CPC ............ *G06F 9/54* (2013.01); *G06F 9/45558* (2013.01); *G06F 9/505* (2013.01); *G06F 2009/4557* (2013.01); *G06F 2009/45591* (2013.01)

(58) Field of Classification Search
CPC ........ G06F 9/54; G06F 9/45558; G06F 9/505; G06F 2009/4557; G06F 2009/45591
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 9,984,648 B2 | 5/2018 | Chakraborty et al. |
| 2019/0102212 A1* | 4/2019 | Bhandari .................. G06T 1/20 |
| 2020/0042355 A1* | 2/2020 | Krishnan .............. G06F 9/5011 |
| 2020/0076920 A1* | 3/2020 | Jambure ................. H04L 67/63 |
| 2020/0409733 A1 | 12/2020 | Sankaran et al. |
| 2021/0303327 A1* | 9/2021 | Vu ....................... G06F 9/45558 |
| 2021/0373972 A1 | 12/2021 | Kurkure et al. |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Farley Abad
(74) *Attorney, Agent, or Firm* — Vista IP Law Group, LLP

(57) ABSTRACT

Methods, systems, and computer program products for high availability computing systems. A computer processor executes a sequence of instructions to execute, on a first node of a computing platform, a first instance of a computing process that is configured to use a first graphics processing unit (GPU) in a first GPU configuration. Responsive to detection of a loss of functionality that affects the first node, an agent automatically determines that a second instance of the computing process can execute on a second node. The determination is made by (1) determining that the second instance of the computing process can execute using a second GPU in a second GPU configuration on the second node, (2) mapping the first GPU configuration into one or more alternate second GPU configurations, and (3) configuring the second instance of the computing process to use the second GPU in one of the alternate second GPU configurations.

18 Claims, 15 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Takizaw, H., et al., "CheCL: Transparent Checkpointing and Process Migration of OpenCL Applications," 2011 IEEE International Parallel & Distributed Processing Symposium, Copyright 2011.
Xiao, S., "Generalizing the Utility of Graphics Processing Units in Large-Scale Heterogeneous Computing Systems," Dissertation submitted to the Faculty of the Virginia Polytechnic Institute and State University in partial fulfillment of the requirements for the degree of Doctor of Philosophy in Computer Engineering, dated Mar. 12, 2012.
"Live Migration for GPU-Accelerated Virtual Machines," NVIDIA, URL: https://www.nvidi.com/en-us/data-center/virtualization/virtual-gpu-migration/, date found via Internet Archive as Aug. 2, 2022.
"Improve Visibility Across Your Workspace Lifecycle," NVIDIA, URL: https://www.nvidia.com/en-us/design-visualization/solutions/it-management/, date found via Internet Archive as Feb. 26, 2022.
"Chapter 5. Migrating virtual machine instances between Compute nodes," Red Hat Customer Portal, URL: https://access.red.com/documentation/en-us/red_hat_openstack_platform/13/html/instances_and_images_guide/migrating-virtual-machines-between-compute-nodes-csp, date found via Internet Archive as Jan. 19, 2022.
"Chapter 11. Configuring virtual GPUs for instances," Red Hat Customer Portal, URL: https://access.redhat.com/documentation/en-us/red_hat_openstack_platform/13/html/instances_and_images_guide/ch-virtual_gpu, date found via Google as Jul. 9, 2020.

* cited by examiner

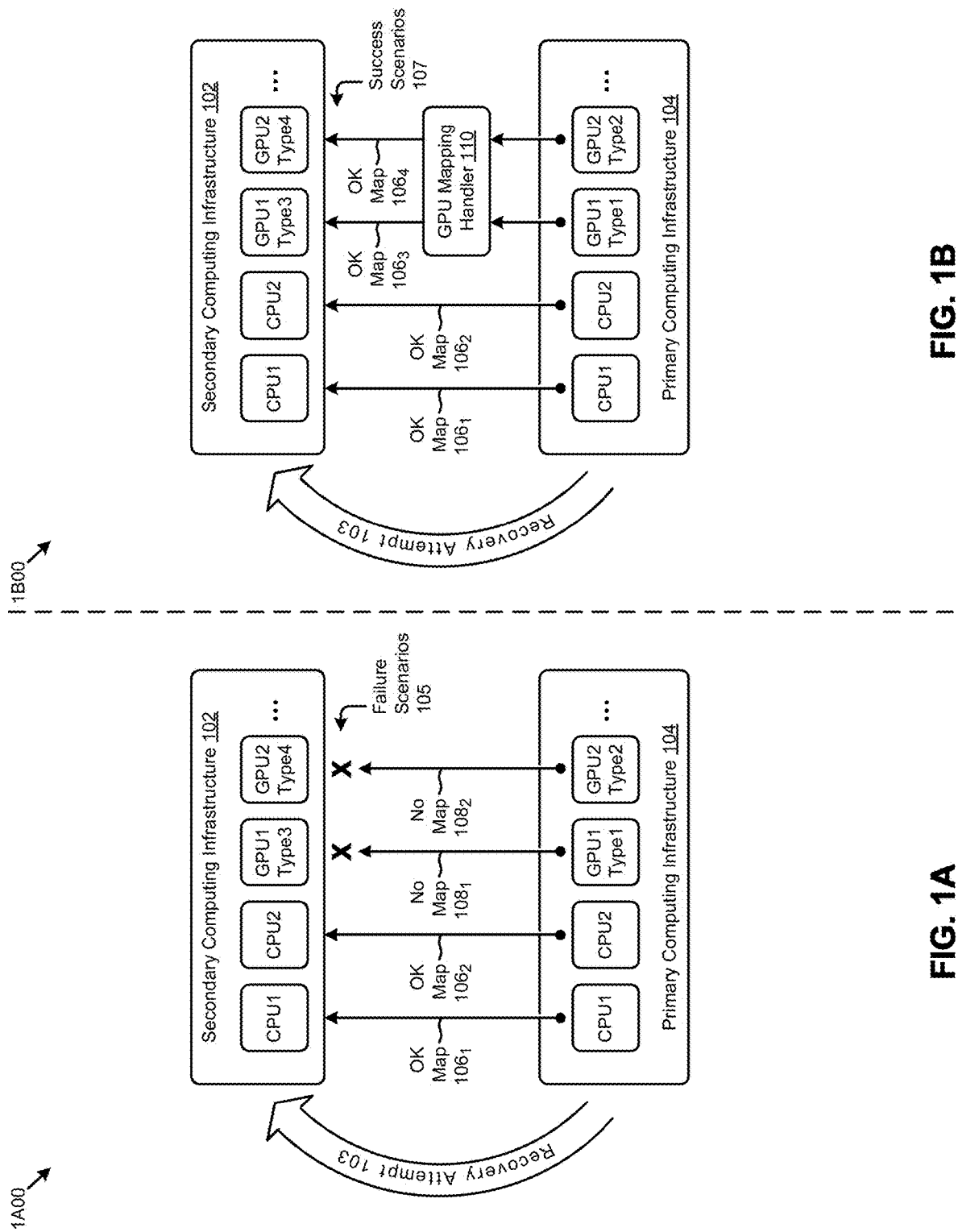

7C00

| Virtual GPU Type | Intended Use Case | Frame Buffer (MB) | Maximum vGPUs per GPU | Maximum vGPUs per Board |
|---|---|---|---|---|
| A10-24Q | Virtual Workstations | 24576 | 1 | 1 |
| A10-12Q | Virtual Workstations | 12288 | 2 | 2 |
| A10-8Q | Virtual Workstations | 8192 | 3 | 3 |
| A10-6Q | Virtual Workstations | 6144 | 4 | 4 |
| A10-4Q | Virtual Workstations | 4096 | 6 | 6 |
| A10-3Q | Virtual Workstations | 3072 | 8 | 8 |
| A10-2Q | Virtual Workstations | 2048 | 12 | 12 |
| A10-1Q | Virtual Workstations | 1024 | 24 | 24 |
| A10-2B | Virtual Desktops | 2048 | 12 | 12 |
| A10-1B | Virtual Desktops | 1024 | 24 | 24 |

FIG. 7C

AUTOMATIC GRAPHICS PROCESSING UNIT SELECTION

TECHNICAL FIELD

This disclosure relates to high availability computing systems, and more particularly to techniques for automatic graphics processing unit (GPU) selection.

BACKGROUND

As time has progressed, computer users have become more and more accustomed to non-stop operation of their computing infrastructure. Users expect that frequently occurring failures of the computing infrastructure (e.g., loss of a node or loss of a network socket) are automatically remediated without requiring user intervention. They expect that the remediation just happens, and often they expect the remediation to take place without any noticeable impact to the computing infrastructure responsiveness.

Concurrently, the scope of the aforementioned computing infrastructure and corresponding failure boundaries have expanded. Nowadays, computer users expect their primary system to be virtualized to the extent that entire applications and/or entire legions of users can be nearly transparently redeployed on so-called backup or secondary infrastructure. Such secondary infrastructure can come in the form of a "standby system," or can come in the form of infrastructure provided by a cloud vendor. When an appropriate secondary computing infrastructure is available, it can be designated as a target for failover in the face of events that cause the primary system to lose some or all of its capabilities.

The designation of appropriate backup computing infrastructure—whether it be computing infrastructure such as the aforementioned "standby system," or whether it be in the form of a cloud-provided infrastructure—becomes more and more complicated as the scope of the failure boundaries have expanded. Moreover, given the rapid adoption of cloud-based computing infrastructures, it comes about that there may be many hundreds of possible failover target configurations, each being configured with vendor-specific hardware offerings. As such, it becomes humanly impossible for a computer user or administrator to designate an appropriate backup computing infrastructure. This situation becomes more and more complicated as the number of users to be 'restored' becomes larger and larger—at least in that each user may be running widely different software applications that demand widely different hardware support (e.g., specialized hardware such as high-performance network interfaces and/or high-performance graphics processing units).

Unfortunately, legacy techniques for designating an appropriate backup computing infrastructure fail to account for the full range of specialized hardware support that is demanded by these software applications. Therefore, what is needed is a technique or techniques that provide high availability of a computing system even when specialized GPUs are demanded by processes of the computing system.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for automatic graphics processing unit selection, which techniques advance the relevant technologies to address technological issues with legacy approaches. More specifically, the present disclosure describes techniques used in systems, methods, and in computer program products for reconfiguring a replacement graphics processing unit in disaster recovery scenarios. Certain embodiments are directed to technological solutions that dynamically reconfigures components of a virtualization system to account for variations between an initially allocated GPU and a replacement GPU when restarting on a recovery node.

The disclosed embodiments modify and improve over legacy approaches. In particular, the herein-disclosed techniques provide technical solutions that address the technical problems associated with providing high availability of a clustered virtualization system even when specialized GPUs are demanded by components of the to-be-restarted virtualization system. Such technical solutions involve specific implementations (e.g., data organization, data communication paths, module-to-module interrelationships, etc.) that relate to the software arts for improving computer functionality.

The ordered combination of steps of the embodiments serve in the context of practical applications that perform steps that dynamically reconfigure components of a virtualization system to account for variations between initially allocated GPUs and candidate replacement GPUs when restarting on a recovery node. As such, techniques that dynamically reconfigure components of a virtualization system to account for variations between an initially allocated GPU and a replacement GPU overcome heretofore unsolved technological problems that arise in the realm of computer systems. Specifically, problems associated with providing high availability of a clustered virtualization system (even when specialized GPUs are demanded by components of the to-be-restarted virtualization system) are solved by the techniques as disclosed herein.

Many of the herein-disclosed embodiments are able to dynamically reconfigure components of a virtualization system to account for variations between an initially allocated GPU and a replacement GPU are technological solutions pertaining to technological problems that arise in the hardware and software arts that underlie high availability computing systems. Aspects of the present disclosure achieve performance and other improvements in peripheral technical fields including, but not limited to, hyperconverged computing platform management and computing cluster management.

Some embodiments include a sequence of instructions that are stored on a non-transitory computer readable medium. Such a sequence of instructions, when stored in memory and executed by one or more processors, causes the one or more processors to perform a set of acts that dynamically reconfigure components of a virtualization system to account for variations between an initially allocated GPU and a replacement GPU (e.g., when restarting on a recovery node).

Some embodiments include the aforementioned sequence of instructions that are stored in a memory, which memory is interfaced to one or more processors such that the one or more processors can execute the sequence of instructions to cause the one or more processors to implement acts that account for variations between an initially allocated GPU and a replacement GPU.

In various embodiments, any combinations of any of the above can be organized to perform any variation of acts for reconfiguring a replacement graphics processing unit in disaster recovery scenarios, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A exemplifies GPU mapping failure scenarios.

FIG. 1B exemplifies GPU mapping success scenarios as used in systems that reconfigure a replacement GPU in disaster recovery scenarios, according to an embodiment.

FIG. 7C depicts sample virtual GPU profile options as used in systems that provide user-defined reconfigurations of GPUs, according to an embodiment.

DETAILED DESCRIPTION

Figure 1C:
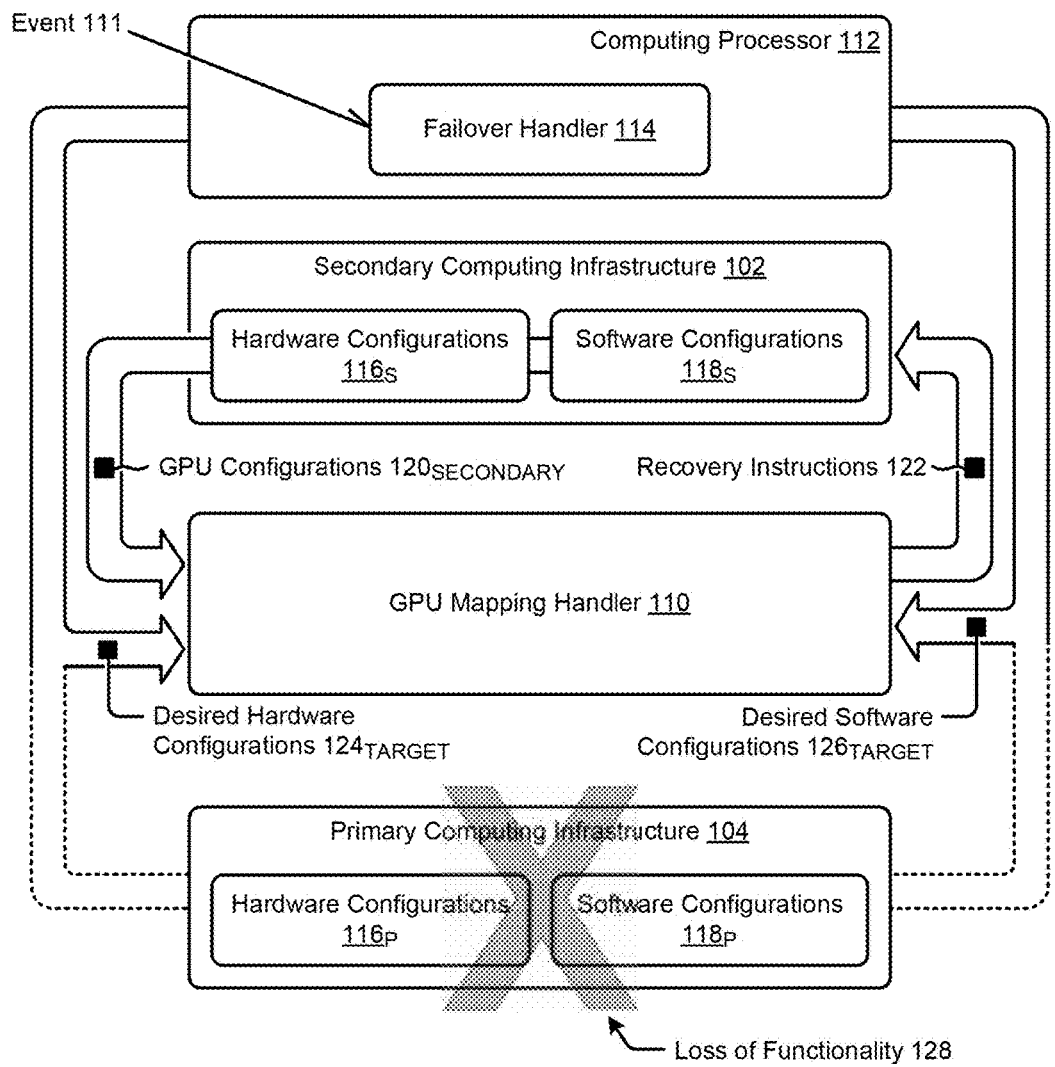
FIG. 1C shows a failover handling system as used to reconfigure a replacement GPU in disaster recovery scenarios, according to an embodiment.

Aspects of the present disclosure solve problems associated with using computer systems for providing high availability of a clustered virtualization system even when specialized GPUs are demanded by components of the to-be-restarted virtualization system. These problems are unique to, and may have been created by, various computer-implemented methods for providing high availability of a clustered virtualization system. Some embodiments are directed to approaches that dynamically reconfigures components of a virtualization system to account for variations between an initially allocated GPU and a replacement GPU when restarting on a recovery node. The accompanying figures and discussions herein present example environments, systems, methods, and computer program products for reconfiguring a replacement graphics processing unit in disaster recovery scenarios.

Overview

Computing platforms (e.g., computing clusters) formed of heterogeneous nodes have become ubiquitous. Various nodes of various capabilities (e.g., size of memory, size and speed of attached storage, etc.) can be stitched together (e.g., via a networking backplane) such that the storage attached to each node is used to form a portion of a contiguous address space that all processors of all nodes can access using the same, common address space to access a storage pool. These sorts of computing platforms have the characteristic that addition of further node into the platform has the effect of adding resources in four dimensions: (1) additional memory (e.g., semiconductor main memory hosted on the added node), (2) additional storage capacity (e.g., number of gigabytes hosted on the added node), (3) additional networking bandwidth, and (4) additional processing resources.

This architecture is extremely flexible, at least in that processes can be easily migrated from one node to another (e.g., since the storage pool addressing is the same regardless of which node is accessing the storage pool). This easy migration has been a boon for high availability systems and high-performance systems. For example, if one node "goes down," the computing processes that were executing on that node can be restarted on another node and/or across many other nodes.

Most processes are oblivious to or at least agnostic to variations between different CPU processors that might be present on any given node. However, the same cannot be said about graphics processors. Different graphics processors have vastly different characteristics. In some cases, a computing process that relies on a GPU might be very sensitive to the capabilities of the underlying GPU. In some cases, a computing process is based on code that has been handcrafted to run with a particular type of GPU. This then complicates the migration process. That is, when a computing process that relies on a particular type of GPU needs to be migrated to a different node, the existence of and capabilities of the GPU (if any) at the different node needs to be checked before migrating. In a naïve implementation, if the GPU at the different node is not the same type of GPU as is expected by the computing process, then the migration fails. This is a strongly unwanted outcome, especially in modern times when a computing cluster might host hundreds or thousands of processes that demand a GPU. Further, legacy techniques for designating an appropriate alternative (e.g., backup) computing infrastructure fail to consider the possibilities for restarting computing processes (e.g., virtual machines, containers, etc.) on the alternative computing infrastructure when the particular target computing infrastructure does not provide for exactly the same set of specialized hardware support that is demanded by certain functions of the computing processes (e.g., virtual machines, virtual desktop applications, etc.).

Addressing the foregoing deficiencies, especially as it pertains to providing recovery of virtual desktop applications, becomes complicated when one considers that certain specialized hardware (e.g., graphic processors) have literally hundreds of individually specifiable capabilities and/or parameters that can be used by said virtual desktop applications. What is needed is a way for a virtual desktop application that is configured to rely on the graphics processing capabilities of a primary computing cluster to be able to be restarted on a secondary computing cluster even though the graphics processing capabilities (e.g., GPUs or GPU configurations) of the secondary system are different from the graphics processing capabilities of the primary system.

An improved way would be to migrate to a target computing node that has a GPU, even if the GPU at the target node is somewhat different. For example, a computing process that is configured to use a GPU to capture a 4 kHD frame buffer might be able to run on a node that has a VGA frame buffer (albeit at a lower resolution). The herein-disclosed techniques involve matching a first set of GPU capabilities to a second set of GPU capabilities, If the second set of capabilities are at least sufficient to run the to-be-migrated computing process, then the computing process can be migrated. Using this technique, the GPUs on both nodes do not have to be the same or be in the same configuration. In fact, using the disclosed techniques, a GPU-hungry computing process can be migrated to a different node even if the GPU at the target node is (a) more capable than the GPU of the source node, or (b) less capable than the GPU of the source node.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies GPU mapping failure scenarios. As an option, one or more variations of GPU mapping failure scenario 1A00 or any aspect thereof may be implemented in the context of the architecture and functionality of the embodiments described herein and/or in any environment.

As shown, during a recovery attempt 103 the central processing units (CPUs) that were in use in the primary computing infrastructure 104 are mapped to CPUs of the secondary computing infrastructure 102. This is depicted by OK map $106_1$ and OK map $106_2$. In this example, CPU1 of the primary computing infrastructure is mapped to CPU1 of the secondary computing infrastructure, and CPU2 of the primary computing infrastructure is mapped to CPU2 of the secondary computing infrastructure. This is a typical case since CPUs of modern computing systems are very often both upwards and downwards compatible. However, the same cannot be said for GPUs. Often different GPUs correspond to very different sets of features and capabilities. This leads to an inability to directly map a GPU of (for example) type1 or type2 to a GPU of (for example) type3 or type4, respectively. This is shown as failure scenarios 105. Specifically, attempting to directly map a GPU of type3 to a GPU of type1 results in a no map $108_1$, and attempting to directly map a GPU of type4 to a GPU of type2 results in a no map $108_2$.

The legacy techniques of FIG. 1A are naïve. Improvements such as are disclosed hereunder improve over the legacy techniques in a manner that results in success scenarios 107.

FIG. 1B exemplifies GPU mapping success scenarios as used in systems that reconfigure a replacement GPU in disaster recovery scenarios. As an option, one or more variations of GPU mapping success scenario 1B00 or any aspect thereof may be implemented in the context of the architecture and functionality of the embodiments described herein and/or in any environment.

By applying the techniques disclosed herein, this mapping problem can be ameliorated or eliminated, such is depicted by success scenarios 107. Specifically, by implementing a GPU mapping handler 110 that implements some or all of the techniques disclosed herein, when attempting to a map a GPU of type3 to a GPU of type1, the GPU mapping handler reconciles GPU capabilities in a manner that results in the shown OK map 106$_3$. Similarly, attempting to map a GPU of type4 to a GPU of type2 results in OK map 106$_4$.

A GPU mapping handler can be implemented in any suitable location within the ecosystem of computing equipment. In some cases, a plurality of standby GPU mapping handlers can be implemented in a plurality of nodes and/or in a plurality of clusters and/or in a plurality of clouds. More specifically, a plurality of GPU mapping handlers can be implemented in multiple locations such that, upon detecting a loss of functionality that affects some particular computing process, or upon detecting a loss of functionality that affects some particular computing process, or upon detecting a loss of functionality that affects operation of or access to some particular computing infrastructure (e.g., an on-premises cluster or a cloud-based cluster), then a GPU mapping handler can operate from a location that is not experiencing the loss of functionality. One possible juxtaposition of a GPU mapping handler for operation within a disaster recovery scenario is shown and described as pertains to FIG. 1C.

FIG. 1C shows a failover handling system as used to reconfigure a replacement GPU in disaster recovery scenarios. As an option, one or more variations of failover handling system 1C00 or any aspect thereof may be implemented in the context of the architecture and functionality of the embodiments described herein and/or in any environment.

The figure is being presented to illustrate how a GPU mapping handler can be used to facilitate recovery operations in event of a disaster. In this particular scenario, the GPU mapping handler facilitates bring-up of the shown secondary computing infrastructure 102 upon detection of a loss of functionality 128 that affects primary computing infrastructure 104.

In the particular configuration of failover handling system 1C00, a failover handler 114 is situated within computing processes 112. Upon detecting an event 111 that corresponds to a loss of functionality 128 that affects primary computing infrastructure 104, the failover handler sends messages to an available instance of a GPU mapping handler. As shown, the messages include information about desired hardware configurations 124$_{TARGET}$ as well as information about desired software configurations 126$_{TARGET}$. The desired hardware configurations and the desired software configurations might reflect the last known configuration states (i.e., before the loss of functionality that affected the primary computing infrastructure) of the primary computing infrastructure (e.g. hardware configurations 116$_P$ or software configurations 118$_P$), or the desired hardware and software configurations might reflect a variation of the last known states of the primary computing infrastructure.

The GPU mapping handler is able to communicate with any one or more operational elements of a selected secondary computing infrastructure 102. In the example case as shown, the GPU handler is able to retrieve the full set of hardware and software configurations (e.g., hardware configurations 116$_S$ and software configurations 118$_S$) of the secondary computing infrastructure. In some cases, the secondary computing infrastructure is a standby recovery platform and, as such, its then-current configuration might be identical or similar to the configuration of the primary computing infrastructure just prior to the loss of functionality. In other cases, the secondary computing infrastructure might not be predefined to be a recovery platform, in fact in some situations the secondary computing infrastructure might not be known until after detection of the loss of functionality. In such cases, the desired hardware configurations and the desired software configurations of the target would need to be analyzed with respect to available GPU configurations (e.g., GPU configurations 120$_{SECONDARY}$) of the target computing infrastructure. Moreover, the desired hardware configurations and the desired software configurations of the target can be provided to the target computing infrastructure as a portion of recovery instructions 122.

As heretofore mentioned, legacy techniques exhibited many mapping failure modes, for example, when the available GPU configurations at the target did not exactly match the GPU configurations of the source. These strongly undesirable failure modes are ameliorated or eliminated by application of flexible GPU reconfiguration techniques that handle cases when GPU configurations at the target do not exactly match GPU configurations of the source. One such flexible technique is shown and described as pertains to FIG. 2.

Figure 2:
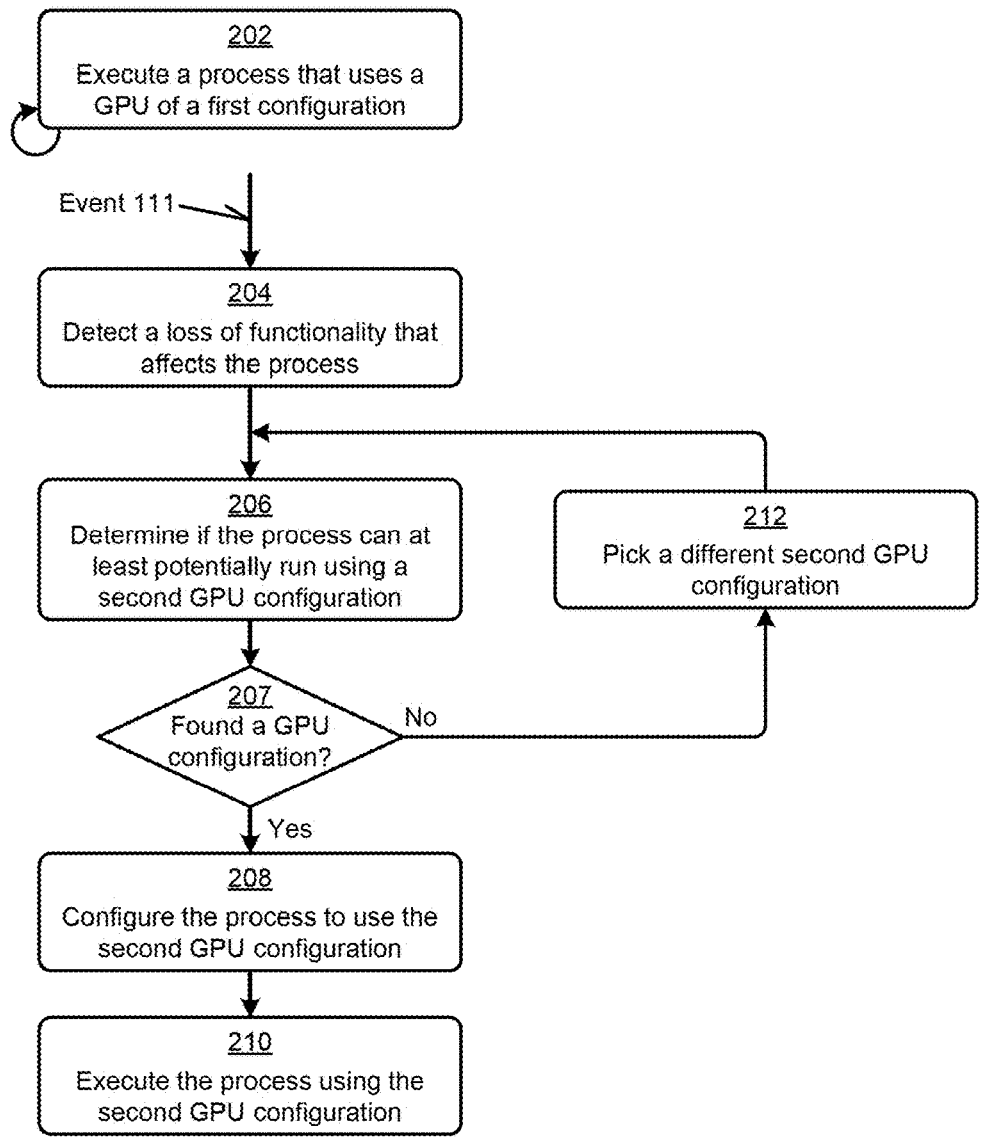
FIG. 2 shows a GPU reconfiguration technique as used in systems that dynamically reconfigure a replacement GPU in accordance with a corresponding demand for GPU resources, according to an embodiment.

FIG. 2 shows a GPU reconfiguration technique as used in systems that dynamically reconfigure a replacement GPU in accordance with a corresponding demand for GPU resources. As an option, one or more variations of GPU reconfiguration technique 200 or any aspect thereof may be implemented in the context of the architecture and functionality of the embodiments described herein and/or in any environment.

This figure is being presented to illustrate one way to transition from ongoing execution of a first computing process using a first GPU configuration to execution of a second computing process using a second GPU configuration even when the second GPU configuration is different from the first GPU configuration.

As shown, step 202 depicts ongoing execution of a first computing process using a first GPU configuration. At some moment in time, it can happen that some event (e.g., event 111) would cause the first computing process to stop or to otherwise lose some functionality. When such a loss of functionality is detected (step 204), GPU reconfiguration technique 200 performs analysis of the first GPU configuration with respect to available GPU configurations. If an available GPU configuration is identified, then the "Yes" branch of decision 207 is taken and the process is reconfigured to use the second GPU configuration (step 208), after which reconfiguration of the process can be executed using the second GPU configuration (step 210).

In some cases during processing of step 206 to determine if the process can run using a particular alternative GPU configuration (e.g., a second GPU configuration, a third GPU configuration, etc.), it can happen that the processing of step 206 determines the process cannot run using a particular alternative GPU configuration. In such a case, a loopback commences (e.g., via the "No" branch of decision 207) after which step 212 serves to pick yet a different alternative GPU configuration. The loopback path re-enters at step 206, this time for consideration of the alternative GPU configuration.

Figure 3:
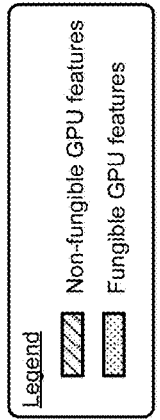
FIG. 3 depicts GPU reconfiguration modes as used in systems that dynamically reconfigure replacement GPUs in accordance with corresponding demands for GPU resources, according to an embodiment.

As can be seen by one of ordinary skill in the art, this GPU reconfiguration technique 200 can be applied in any computing architecture. Strictly as examples, GPU reconfiguration technique 200 can be applied, possibly repeatedly, in a high availability computing setting, possibly during recovery after a disaster. Additionally or alternatively, GPU reconfiguration technique 200 can be applied, possibly repeatedly, when migrating a process or group of processes from an on-premises setting to a cloud setting. Moreover, GPU reconfiguration technique 200 can be applied when new GPU hardware is introduced to a computing node. FIG. 3 depicts several reconfiguration modes (e.g., up-provisioning and down-provisioning) that operate to dynamically reconfigure replacement GPUs.

FIG. 3 depicts GPU reconfiguration modes as used in systems that dynamically reconfigure replacement GPUs in accordance with corresponding demands for GPU resources. As an option, one or more variations of GPU reconfiguration modes 300 or any aspect thereof may be implemented in the context of the architecture and functionality of the embodiments described herein and/or in any environment.

The figure is being presented to illustrate the possibilities for reconfiguration when a target GPU profile is different from the source GPU profile. More specifically, the figure is being presented to illustrate (1) how certain GPU profiles project onto alternative GPU profiles in a manner that supports up-provisioning (case #1), (2) how certain GPU profiles project onto alternative GPU profiles in a manner that supports down-provisioning (case #2), and (3) how certain GPU profiles project onto alternative GPU profiles in a manner that prevents either up-provisioning or down-provisioning (case #3).

As used herein, a GPU profile is information that defines the metes and bounds of an amount and type of GPU hardware and/or its software driver. In exemplary cases, this information is codified into a data structure.

To further explain, and specifically referring to case #1, consider that GPU profile T1 refers to features/capabilities of a GPU that form a proper subset of the features/capabilities of GPU profile T2. As such, when mapping a first GPU profile to a second GPU profile, all of the features/capabilities that might be demanded by a subject process that was using the first GPU can be provided by the second GPU, and then some (as shown). In some situations it is possible that the additional capabilities that the second GPU profile T2 provides in excess of the capabilities of the first GPU profile T1 can be used to boost the GPU facilities' power provided to the subject process. In other situations, it is possible that the additional capabilities of the second GPU profile T2 can be provided to a different process.

As regards the shown case #2, it can happen that GPU profile T3 includes many, but not all of the features/capabilities of GPU profile T1. In this case, even though GPU profile T3 includes fewer than all of the features/capabilities of GPU profile T1, it might be possible to down-provision into GPU profile T3. Strictly as one example, suppose that GPU profile T1 includes 16 GB of GPU memory, but GPU profile T3 has only 8 GB of GPU memory. In accordance with this case #2, even though GPU profile T3 has only 8 Gb of memory, whereas GPU profile T1 has 16 GB of GPU memory, it might be possible to down-provision into GPU profile T3. In some cases, in spite of T3's GPU memory being only half the size of T1's GPU memory, it might have no effect on the overall system.

Consider two processes, each of which demands 8 GB of GPU memory. It could be that the two processes timeshare the GPU such that the first process uses 8 GB of GPU memory (e.g., for a graphical user interface (GUI) or other desktop application) and the second process also uses 8 GB of GPU memory (e.g., for a GUI or other desktop application). When the first process is in a pending state, its then current state of the GPU memory can be paged out, thus freeing up the 8 GB of GPU memory for the second process, and so on. The foregoing is a case where certain specific types of demanded GPU resources are fungible in the sense that GPU memory of the GPU device corresponding to GPU profile T1 is fungible with respect to a similar amount of GPU memory of the GPU device corresponding to GPU profile T3.

Most GPUs have a combination of fungible and non-fungible features/capabilities. For example, the feature/capability "ray tracing accelerator" cannot be traded as a fungible features/capability. In such cases, mapping may fail—at least for that combination of profiles. Case #3 illustrates such a case. As shown, there is a mismatch between GPU profile T1 and GPU profile T4 since GPU profile T1 specifies certain non-fungible features/capabilities that cannot be substituted or otherwise satisfied by GPU profile T4.

In most multi-node computing platforms it is at least theoretically possible that there might be many GPUs across the nodes. As such, even if one particular pair of GPU profiles does not match into an up-provisioning mode or into a down-provisioning mode, it might be possible that another pair of GPU profiles would satisfy the needs of an up-selection or down-selection. One way to improve the likelihood of finding match-compatible pairings is to select a secondary computing infrastructure (e.g., drawn from cloud vendor #1, or from cloud vendor #2, etc.) such that the secondary computing infrastructure does satisfy all of the demanded configurations. Determinations pertaining to whether or not a particular cloud-provided infrastructure can satisfy all of the demanded configurations can be facilitated by probing a cloud vendor's infrastructure for a manifest of available GPU configurations.

Figure 4:
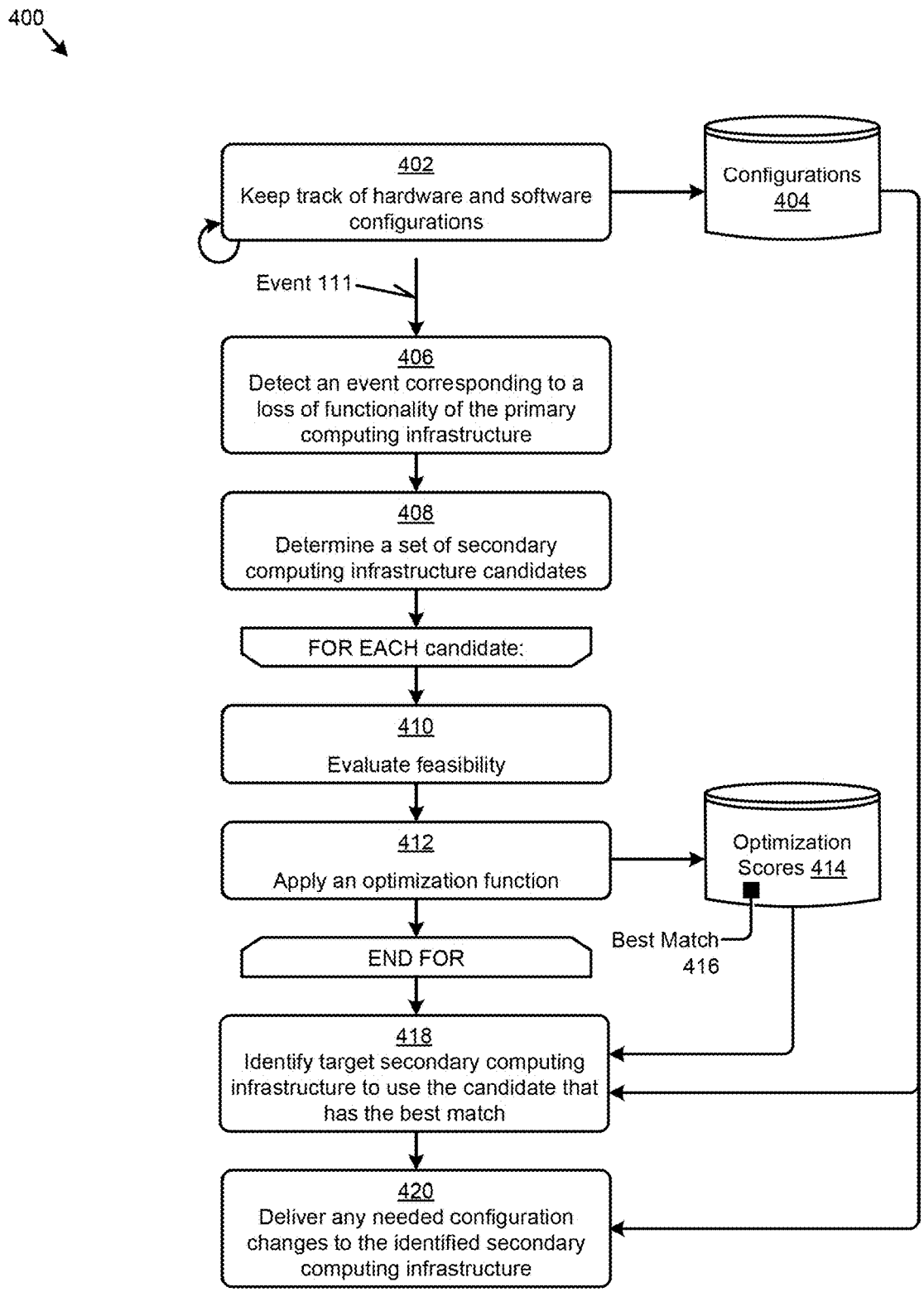
FIG. 4 depicts a secondary computing infrastructure selection technique as used in systems that dynamically reconfigure replacement GPUs in accordance with computing process demands for GPU resources, according to an embodiment.

One approach to identifying a secondary computing infrastructure that does satisfy all of the demanded configurations is shown and described as pertains to FIG. 4.

FIG. 4 depicts a secondary computing infrastructure selection technique as used in systems that dynamically reconfigure replacement GPUs in accordance with computing process demands for GPU resources. As an option, one or more variations of secondary computing infrastructure selection technique 400 or any aspect thereof may be implemented in the context of the architecture and functionality of the embodiments described herein and/or in any environment.

The figure is being presented to illustrate one way to identify a secondary computing infrastructure that satisfies all of the demanded configurations. Moreover, the figure is being presented to illustrate one way to optimize selection of a secondary computing infrastructure that satisfies all of the demanded configurations.

The figure depicts an ongoing task 402 that keeps track of hardware and software configurations 404 of the primary computing infrastructure as well as any one or more candidate target computing infrastructures. In some cases, the changes to the configurations of any computing infrastructure are under control by the same entity. In other cases, the configurations of a potential target computing infrastructure might be under control by an entity that is different from the entity that operates the source computing infrastructure. In still other cases, such as when cloud-based infrastructure is used, the configuration of a candidate target computing infrastructure can be deferred until after event 111 and a corresponding loss of functionality has been detected.

The occurrence of event 111 and any detection of a corresponding loss of functionality of the primary computing infrastructure (step 406) leads to a series of steps that analyze multiple secondary computing infrastructure candidates so as to resolve to an intended target computing system that is a suitable (or possibly optimal) replacement for the source computing system that suffered the loss of functionality. Specifically, step 408 serves to identify one or more secondary computing infrastructure candidates such that those candidates can be analyzed for feasibility (step 410) and for optimality (step 412). An optimization score (e.g., results of an optimization functions) for each candidate secondary computing infrastructure is stored in one or more persistent storage locations that are suitable for maintaining a plurality of optimization scores 414.

When all multiple secondary computing infrastructure candidates have been considered, the best match 416 (or multiple best matches in case of a tie) are considered with respect to the last known configuration of the (now lost) primary computing infrastructure as compared with the configuration of the best match target computing infrastructure (step 418). In some cases, it can happen that the best match target computing infrastructure is not precisely in the configuration as demanded by any software components of the (now lost) primary computing infrastructure. For example, a plurality of software components might each demand 2 GB of frame buffer. To accommodate this, the target computing infrastructure, specifically a GPU of the target computing infrastructure, might be configured with multiple 2 GB private memory partitions, which in aggregate satisfies the plurality of software components under consideration. This is merely one example, and other configuration changes are possible. Accordingly, step 420 serves to deliver any needed configuration changes to the identified secondary computing infrastructure.

It should be noted that the foregoing software components under consideration might be any one of (1) an operating system component, (2) a process that runs under an operating system, (3) a virtualization system hypervisor component, (4) a virtualization system controller virtual machine, (5) a user virtual machine, (6) an executable container, or (7) any other partitioning or embodiment of an executable software component. Further it should be noted that any/all of the foregoing types of partitions or embodiments of an executable software component can be combined to form a computing cluster. In some multi-cluster environments, a target computing cluster can be designated as a secondary platform in case of a failure of the primary platform. Moreover, in some such multi-cluster environments, a stand-alone multi-cluster supervisor node can facilitate how to bring-up a target recovery platform in case of a failure of the primary platform.

Figure 5A:
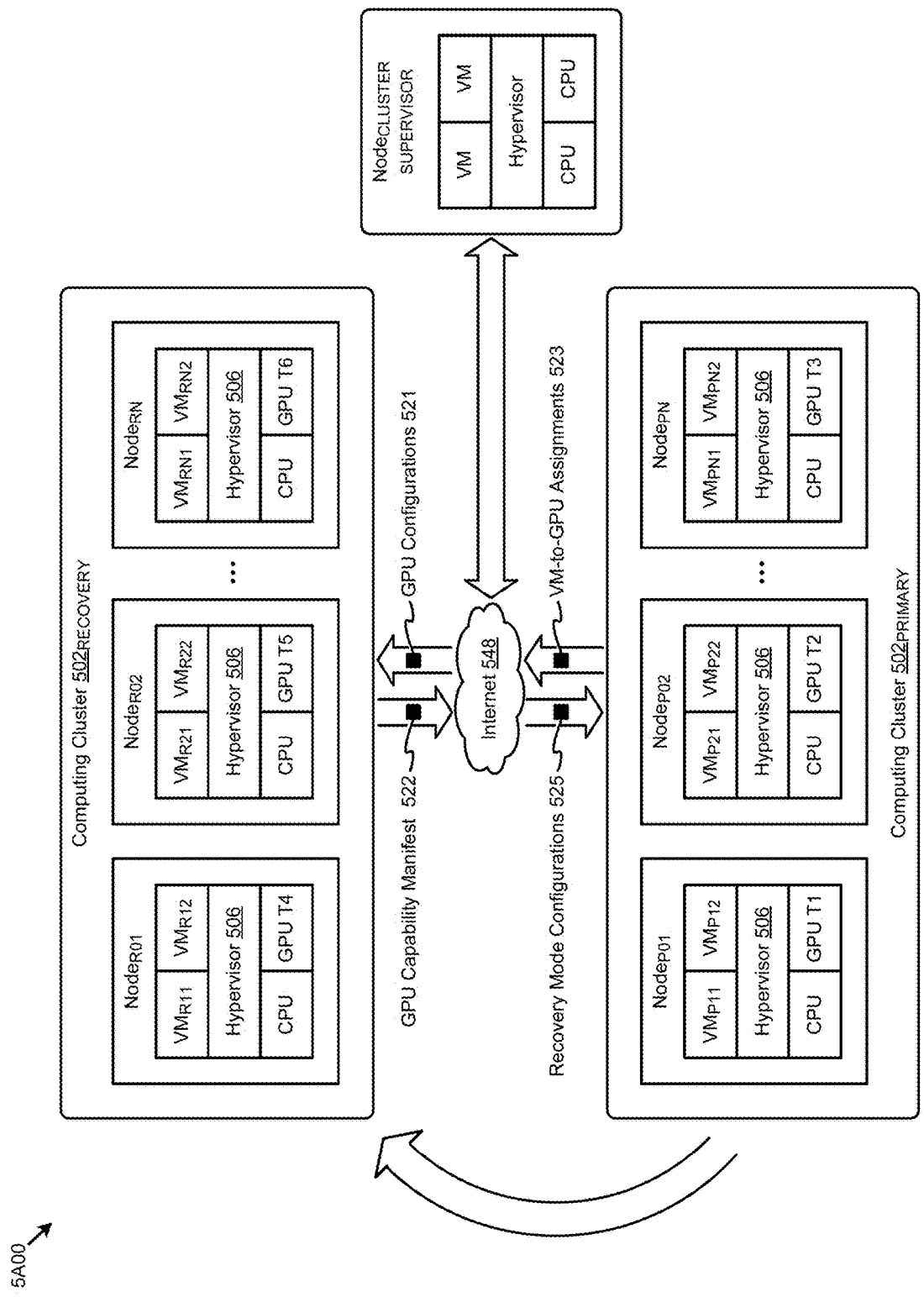
FIG. 5A depicts a target cluster reconfiguration scenario as used in systems that dynamically reconfigure replacement GPUs in accordance with corresponding demands for GPU resources, according to an embodiment.

FIG. 5A depicts a target cluster reconfiguration scenario as used in systems that dynamically reconfigure replacement GPUs in accordance with corresponding demands for GPU resources. As an option, one or more variations of target cluster reconfiguration scenario 5A00 or any aspect thereof may be implemented in the context of the architecture and functionality of the embodiments described herein and/or in any environment.

The figure is being presented to illustrate an environment in which a recovery computing cluster (e.g., recovery computing cluster $502_{RECOVERY}$) can be maintained in a standby mode such that, in event of a loss of functionality of primary computing cluster $502_{PRIMARY}$, the recovery computing cluster can be brought up with substantially the same operational capabilities as was available on the (now failed) primary computing cluster.

As shown, each computing cluster includes a plurality of interconnected computing nodes (e.g., $node_{P01}$, $node_{P02}$, . . . , $node_{PN}$; $node_{R01}$, $node_{R02}$, . . . , $node_{RN}$), with each node having at least one CPU, at least some components of a virtualization system (e.g., hypervisor 506), and any number of virtual machines (e.g., $VM_{R11}$, $VM_{R12}$, $VM_{R21}$, $VM_{R22}$, $VM_{RN1}$, $VM_{RN2}$, $VM_{P11}$, $VM_{P12}$, $VM_{P21}$, $VM_{P22}$, $VM_{PN1}$, $VM_{PN2}$). In this particular embodiment, the nodes of each computing cluster each also includes graphics processing units of different types (e.g., GPU T1, GPU T2, GPU T3, GPU T4, GPU T5, GPU T6). The computing clusters communicate over Internet 548. Further, each of the two shown computing clusters can be monitored and configured by the independent node labeled as $node_{CLUSTERSUPERVISOR}$. More particularly, the independent node labeled as $node_{CLUSTERSUPERVISOR}$ is able to load virtual machines onto the computing clusters, and thereafter, start/restart those virtual machines.

During ongoing operation, primary computing cluster $502_{PRIMARY}$, is able to retrieve a GPU capability manifest 522 as well as recovery mode configurations 525 from recovery computing cluster $502_{RECOVERY}$. This permits primary computing cluster $502_{PRIMARY}$ to pre-stage the shown recovery computing cluster $502_{RECOVERY}$ such that in event of a failure or loss of functionality of primary computing cluster $502_{PRIMARY}$, then recovery computing cluster $502_{RECOVERY}$ can be quickly brought up as a replacement. More particularly, and with respect to the herein-disclosed techniques, the primary computing cluster $502_{PRIMARY}$ can pre-stage the shown recovery computing cluster $502_{RECOVERY}$ with specific GPU configurations 521. In some cases, primary computing cluster $502_{PRIMARY}$ can pre-stage the shown recovery computing cluster $502_{RECOVERY}$ with specific VM-to-GPU assignments 523.

Determination and mapping of the specific GPU configurations 521 can be automated by a computing element running in the independent node labeled as $node_{CLUSTERSUPERVISOR}$. In some cases, determination and mapping of certain of the specific GPU configurations 521 can be facilitated by a user or administrator who manipulates graphical screen widgets of a user interface.

Figure 5B:
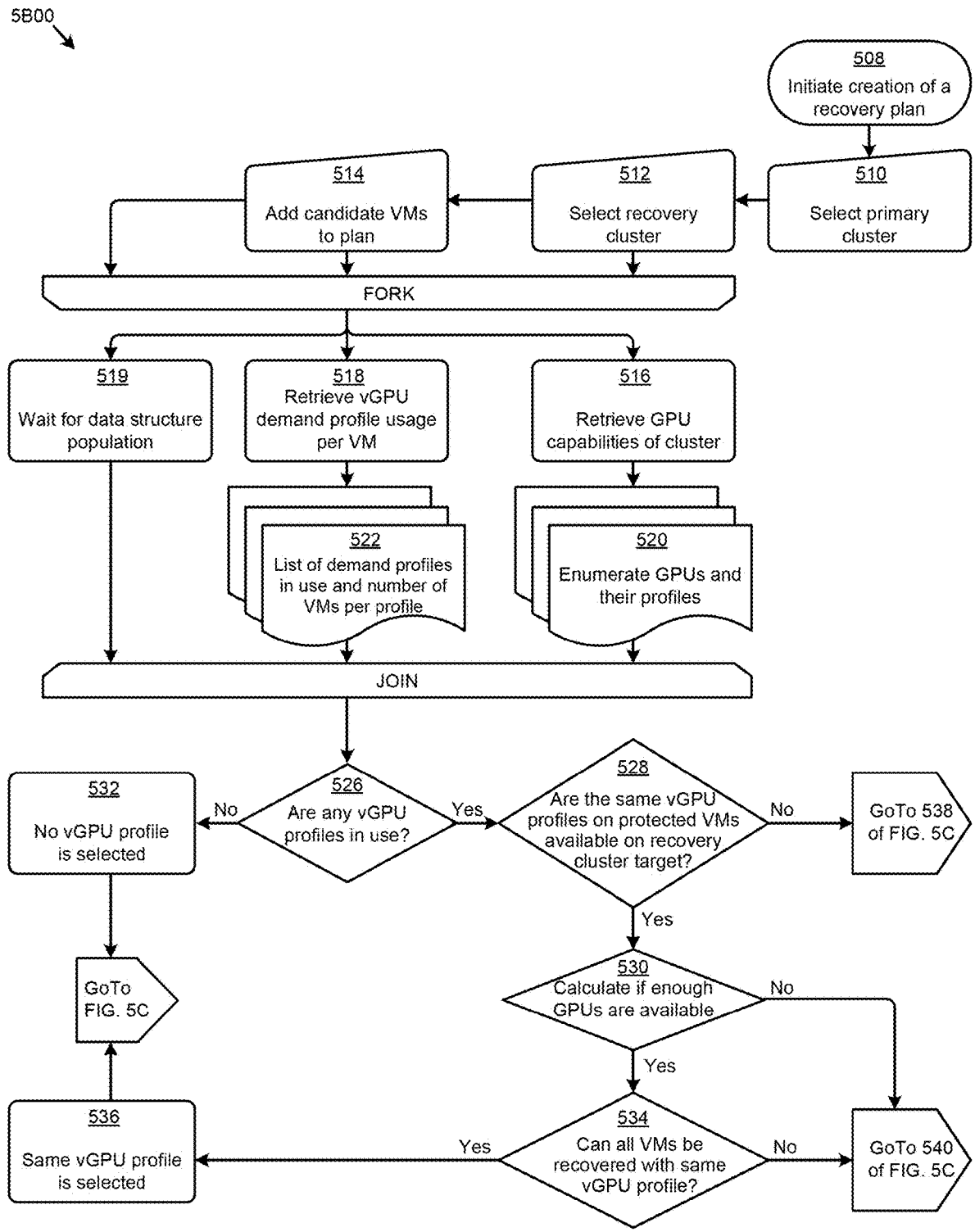
FIG. 5B depicts a process for creating a GPU resource recovery plan as used to dynamically reconfigure replacement GPUs in accordance with corresponding demands for GPU resources, according to an embodiment.
Figure 5C:
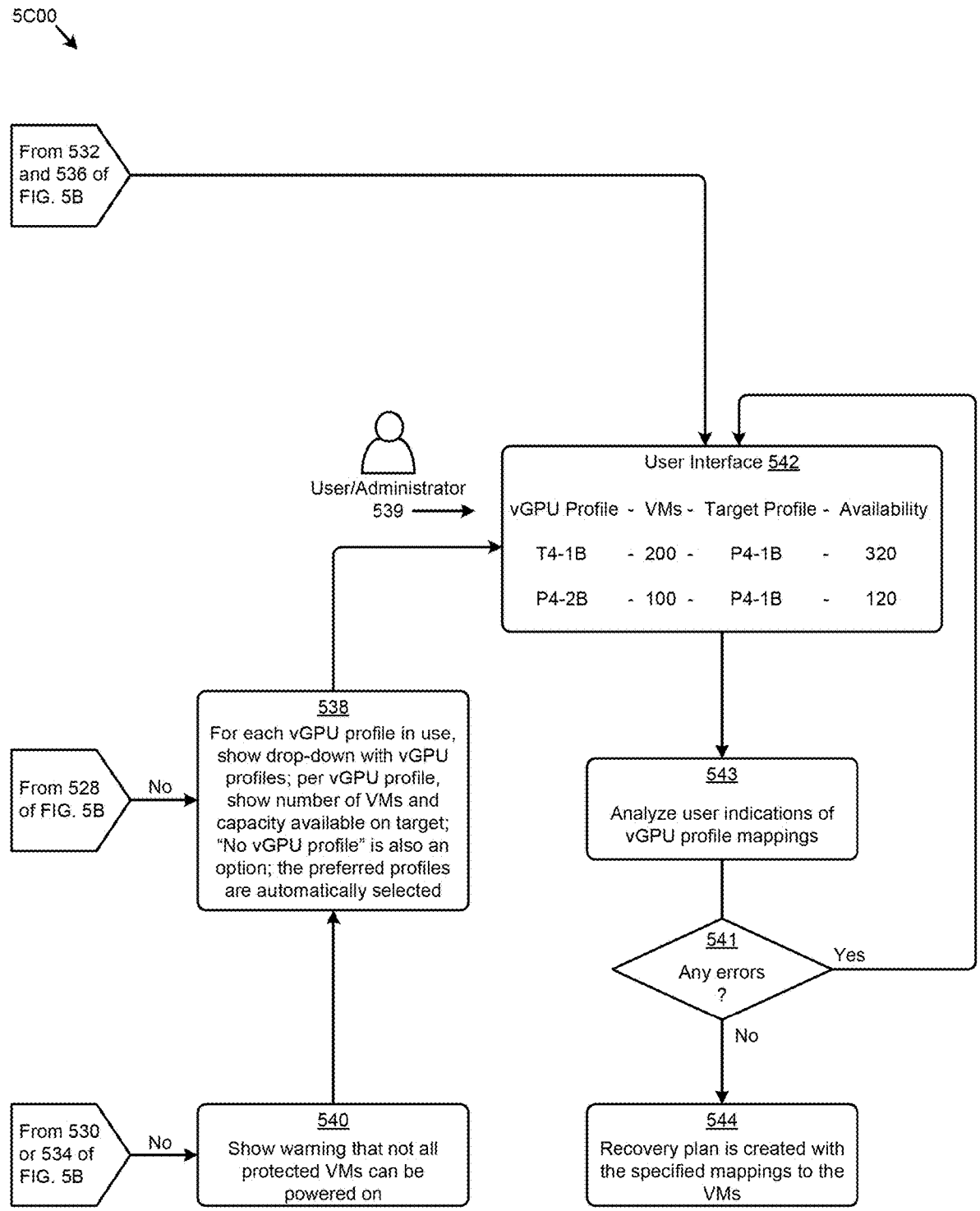
FIG. 5C depicts a user interface use model as used in combination with user-influenced selection of replacement GPUs, according to an embodiment.

A user or administrator might want to create a GPU resource recovery plan in advance of any failure event. FIG. 5B shows an example process for creating the GPU resource recovery plan. FIG. 5C shows an example of how a user or administrator might interact with a graphical user interface to define specific characteristics of such a GPU resource recovery plan.

Once a GPU resource recovery plan has been codified then, responsive to occurrence of a failure event, the GPU resource recovery plan or variation thereof can be invoked by an administrator. When such a GPU resource recovery plan is invoked, various checks are carried out to validate that the pre-defined GPU resource recovery plan is still feasible. More specifically, checks are carried out to validate that the GPU profiles used in the GPU resource recovery plan are indeed available at the recovery location. If so, then the GPU resource demands of the processes of the source computing infrastructure can be satisfied by the GPUs of the recovery computing infrastructure.

FIG. 5B depicts a process for creating the GPU resource recovery plan as used to dynamically reconfigure replacement GPUs in accordance with corresponding demands for GPU resources. As an option, one or more variations of virtualization system planning system 5B00 or any aspect thereof may be implemented in the context of the architecture and functionality of the embodiments described herein and/or in any environment.

The shown process for creating the GPU resource recovery plan commences at step 508 that initiates creation of a GPU resource recovery plan. The plan generation can be applied to any pair of clusters. Accordingly a first cluster (e.g., the primary cluster of step 510) is selected, followed by a selection of a recovery cluster (process 512). Step 514 serves to load all candidate VMs into the plan. In some cases candidate VMs include all VMs that were running at the time of the failure. In some cases the candidate VMs exclude VMs that are not intended to be restarted.

Several procedures are invoked within a FORK/JOIN block. As shown, process 518 serves to retrieve virtual GPU (vGPU) demand profiles for each VM. Process 518 executes in parallel with process 519 and process 516. Within this FORK/JOIN block, process 516 serves to retrieve GPU capabilities from the selected recovery cluster. Concurrently, GPU demand profiles for the VMs are retrieved (process 518). The GPU demand profiles are stored in a first data structure 522, whereas all GPU profiles corresponding to the GPUs of the recovery cluster are stored in second data structure 520. When the foregoing data structures have been populated, the planning system of FIG. 5B continues.

Such planning involves assessment of demanded GPU capabilities with respect to GPU availabilities. In some cases, there are no demands for GPU capabilities, in which case the "No" branch of decision 526 is taken and the determination that there are no GPU demands is codified (step 532). On the other hand, it might happen that, indeed, there are demands for GPU capabilities, in which case, the "Yes" branch of decision 526 is taken and a determination is made (decision 528) as to whether the GPU demand profiles match up with the available GPU profiles of the recovery cluster. Then decision 530 calculates of there exists sufficient GPU availability at the target infrastructure to satisfy all demand profiles. If so, then flow proceeds to decision 534 where it is determined whether or not all VMs can be recovered using the same vGPU demand profile. If so, then the "Yes" branch of decision 534 is taken and the same vGPU demand profile is selected (action 536).

As used herein, a GPU demand profile (or vGPU demand profile) is information that defines the metes and bounds of an amount and type of GPU support requested by a computing process. In exemplary cases, this information is codified into a computer data structure. In exemplary cases, human-readable characteristics of GPU demands and/or an amalgamation of demands across multiple GPU demand profiles data structures can be presented in a graphical user interface (GUI). Certain mapping situations can be confirmed, augmented, or remediated using such a GUI.

All of the steps of the FIG. 5B process for creating the GPU resource recovery plan can be carried out automatically. However, it can sometimes happen that a user or administrator can modify (e.g., override or otherwise adjust) the automatically determined mappings. To provide for such a possibility of user or administrative modifications of the automatically determined mappings, some embodiments include a user interface to facilitate such user or administrative modifications.

To illustrate mapping situations when GPU mapping is fully automatic versus when GPU mapping is partially automatic and partially subject to user intervention, consider the following four scenarios:

Scenario #1 addresses the case when no vGPU profiles are in use. In this scenario, no GPU mapping is needed.

Scenario #2 addresses the case when the same vGPU profiles that are in use in the failed computing infrastructure (e.g., source computing infrastructure) are also available in the recovery computing infrastructure (e.g., target computing infrastructure). The same vGPU profiles that were in use by the VMs of the failed computing infrastructure are selected for use by the VMs of the recovery computing infrastructure.

Scenario #3 addresses the case where the same profiles are available, but according to the aggregate GPU demand level, there are not enough GPU resources at the recovery computing infrastructure to satisfy all demands.

Scenario #4 addresses the case when at least some profiles available on the recovery computing infrastructure are different as compared to the profiles that were in use at the failed computing infrastructure.

For scenario #3 and scenario #4 there are various alternative options. For instance, Option #1 involves fully automatic configuration of vGPU profiles. In some cases such automatic configuration of vGPU profiles are automatically configured according to any one or more default mapping overrides. Option #2 involves semi-automatic configuration. Under this option, a set of vGPU profiles are automatically configured/reconfigured, however a GUI is presented such that a user or administrator can see an overview of the mappings and can then make adjustments using widgets of the GUI. Option #3 involves manual configuration. For manual configuration, a user or administrator is presented with a GUI. The GUI has sufficient widgets to facilitate user- or administrator-defined mappings from various source vGPU profiles to target vGPU profiles. Both up-provisioning and down-provisioning are supported. A use model for using a GUI is shown and described as pertains to FIG. 5C.

FIG. 5C depicts a user interface use model as used in combination with user-influenced selection of replacement graphics processing units (GPUs). As an option, one or more variations of user interface use model 5C00 or any aspect thereof may be implemented in the context of the architecture and functionality of the embodiments described herein and/or in any environment.

The figure is being presented to explain how a user or administrator can interact with a GUI in the event that user-assisted or administrative-assisted mappings are desired. Specifically, it can happen that the "No" branch of decision 534 is taken because there needs to be multiple different vGPU demand profiles involved when mapping to a recovery cluster. In such a case, the user interface indicates (at step 540) that user intervention might be required to complete the mapping. In another scenario, it can happen that the "No" branch of decision 528 is taken because there needs to be multiple different vGPU demand profiles involved when mapping to a recovery cluster. In such a case, the user interface is populated (step 538) with sufficient information such that the user can supply additional information as may be needed to complete the mapping. In this embodiment, a screen widget 542 is presented to a user or administrator. The screen widget facilitates user selection or overrides of GPU profiles to be associated with various VMs. It should be noted that the screen widget 542 is configured such that the GPU demands of many VMs can be mapped in batches.

When the user/administrator 539 has finished interaction with screen widget 542, the flow proceeds to step 543 where the user indications are analyzed. If there are no errors in the mappings (test 541), the "No" branch is taken and the recovery plan is codified in accordance with the specified vGPU demand profiles (step 544). Otherwise, the "Yes" branch taken and the user/administrator can remediate the errors using screen widget 542. When the recovery plan is executed, the computing processes that were formerly executing on the failed cluster are restarted on the target cluster. Any VMs that are candidates for restarting and/or any metadata pertaining to any VMs that are candidates for restarting might be modified to be restarted with one of the up-provisioned or down-provisioned GPU demand profiles.

As can now be understood, the demand profiles of any one or more VMs can be modified such that the demand can be satisfied by one or more of the GPUs of the recovery cluster. As previously indicated, it is possible that the mapping results in a down-provisioning, where the mapping results in fewer GPU capabilities being given to the virtual machine. Also, it is possible that the mapping results in an up-provisioning, where the mapping results in more GPU capabilities being given to the virtual machine. To further explain, FIG. 6 shows and describes up-provisioning, where a VM is reconfigured to use a more powerful type of GPU of the recovery cluster.

There are many variations to the flow of FIG. 5C. More particularly, there are many alternative embodiments of screen widget 542. In the shown embodiment, for each vGPU profile demanded, a number of VMs that demand a particular vGPU profile are presented. Also, for each such vGPU profile, there is a dropdown/selection box that contains the available vGPU profiles from the target cluster. In some embodiments, one or more screen widgets can show the number of available VMs that could be hosted under that profile. As can be understood by those of ordinary skill in the art, the target profiles listed and corresponding availabilities are dynamic items. That is, when a target profile is assigned, that choice might impact the choices available for the next type of profile. Additionally or alternatively, instead of displaying a listing that is organized on a per source vGPU profile basis, it is possible to present a listing that is organized by source VMs in which their corresponding source vGPU profiles are presented next to each listed VM. A selection box or other widget presents possible target vGPU profiles.

As can be seen, it is possible that a virtual machine that had been configured for a (for example) GPU demand corresponding to a lower capability GPU can be reconfigured to a GPU demand corresponding to a higher capability GPU. Strictly as one example, a virtual machine GPU profile reconfiguration scenario is shown and described as pertains to FIG. 6.

Figure 6:
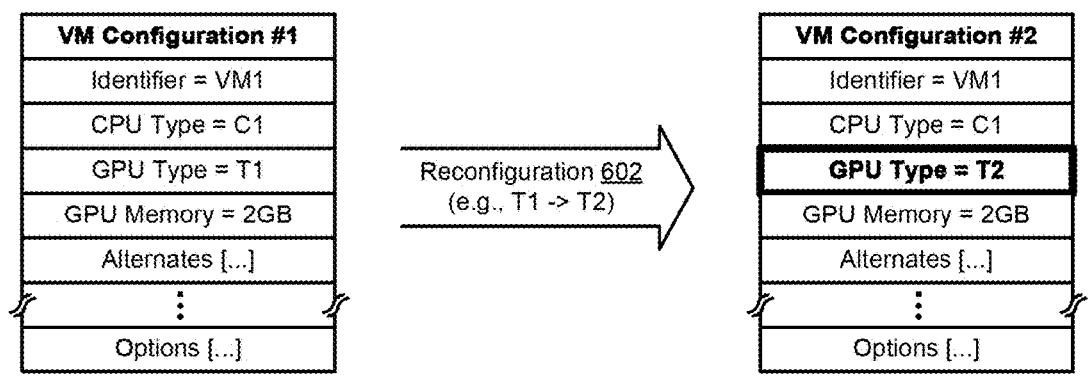
FIG. 6 depicts a virtual machine GPU profile reconfiguration scenario as used in virtualization systems that dynamically reconfigure replacement GPUs in accordance with corresponding GPU demands from a virtual machine, according to an embodiment.

FIG. 6 depicts a virtual machine GPU profile reconfiguration scenario as used in virtualization systems that dynamically reconfigure replacement GPUs in accordance with corresponding GPU demands from a virtual machine. As an option, one or more variations of virtual machine GPU profile reconfiguration scenario 600 or any aspect thereof may be implemented in the context of the architecture and functionality of the embodiments described herein and/or in any environment.

The figure depicts two VM configurations, "VM Configuration #1" and "VM Configuration #2." Each configuration includes a VM identifier (e.g., "VM1"), a CPU type (e.g., "C1"), a GPU memory minimum constraint (e.g., "2 GB"), and other alternates and options. Further, each configuration includes a GPU type (e.g., "T1", "T2"). In the shown example, the acts of reconfiguration 602 serves to up-provision from a GPU of type="T1" to a GPU of type="T2".

Figure 7A:
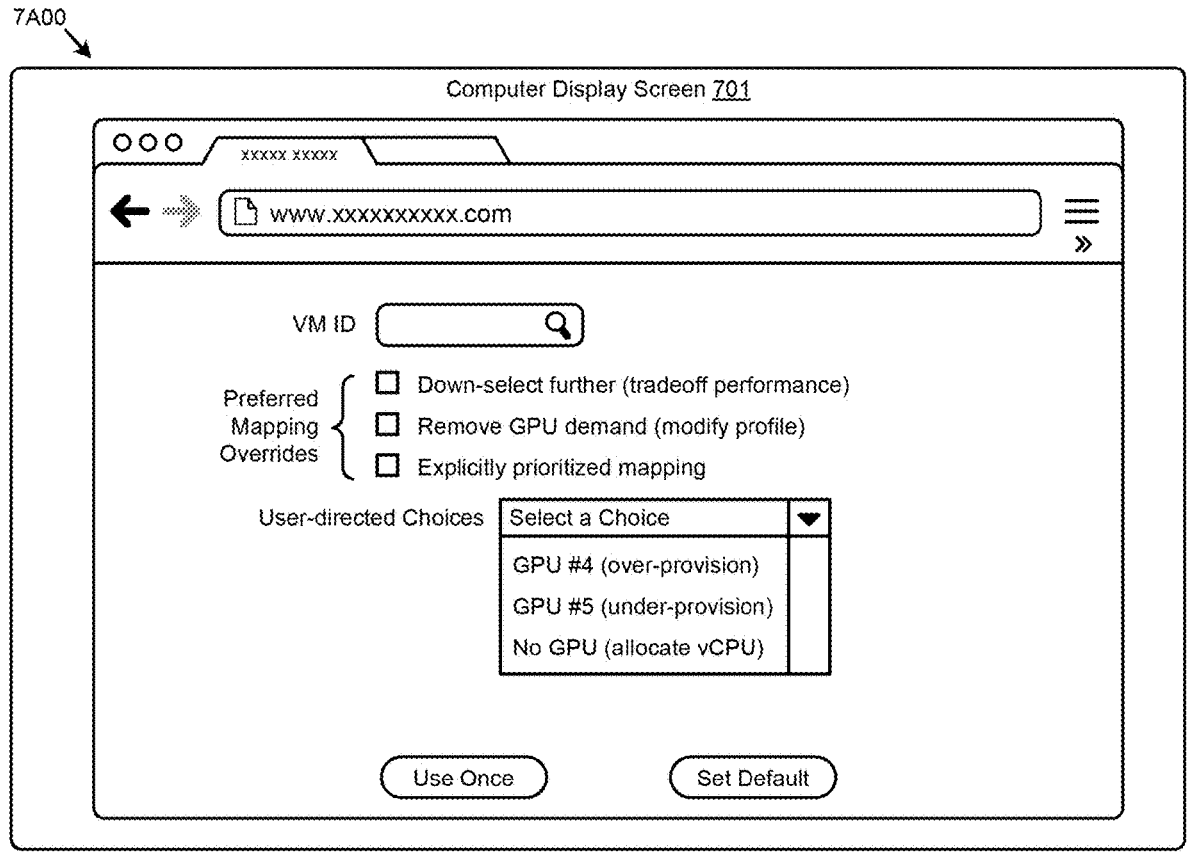
FIG. 7A depicts a sample GPU reconfiguration user interface as used in systems that provide user-defined reconfigurations of GPUs, according to an embodiment.

FIG. 7A depicts a sample GPU reconfiguration user interface as used in systems that provide user-defined reconfigurations of GPUs. As an option, one or more variations of GPU reconfiguration user interface 7A00 or any aspect thereof may be implemented in the context of the architecture and functionality of the embodiments described herein and/or in any environment.

As shown, the GPU reconfiguration user interface is presented in a computer display screen 701. The GPU reconfiguration user interface includes an input box for designation of a virtual machine ID. The virtual machine ID can be automatically populated. Additionally or alternatively, it can be entered or over-ridden by a user/administrator.

A selection of preferred mapping overrides are shown, any one or more of which can be enabled/disabled by a user or administrator (e.g., via a checkbox widget). The GUI includes a further selection widget that permits the user/administrator to indicate preferences for mapping the identified VM to a particular GPU. As shown, both over-provisioning and under-provisioning options are presented as possible user-directed choices.

It should be noted that although it might be possible to configure upwards to a more capable GPU (up-provisioning, based on upward compatibility), and although it might be possible to configure downwards to a less capable GPU (down-provisioning, based on downward compatibility), it might not always be possible to find a suitable second GPU reconfiguration. This can happen if there are demands for GPU capacity or functionality in the first GPU configuration that cannot be satisfied by any considered second GPU configurations. Accordingly, the user interface presents choices that include mapping of the GPU demands of the identified VM onto a virtual CPU by down-selecting to a software implementation of graphics handling features).

In any of the foregoing mapping operations (e.g., up-provisioning or down-provisioning), characteristics of the identified VM are modified to reflect the result(s) of the mapping operations. The modified VM is then subjected to being restarted on the target node.

It should be noted that during user/administrator interaction with the GPU reconfiguration user interface, it can happen that the state of the mapping changes. Accordingly, various GPU mapping status indicators are provided, a selection of which GPU mapping status indicators are shown and described as pertains to FIG. 7B.

Figure 7B:
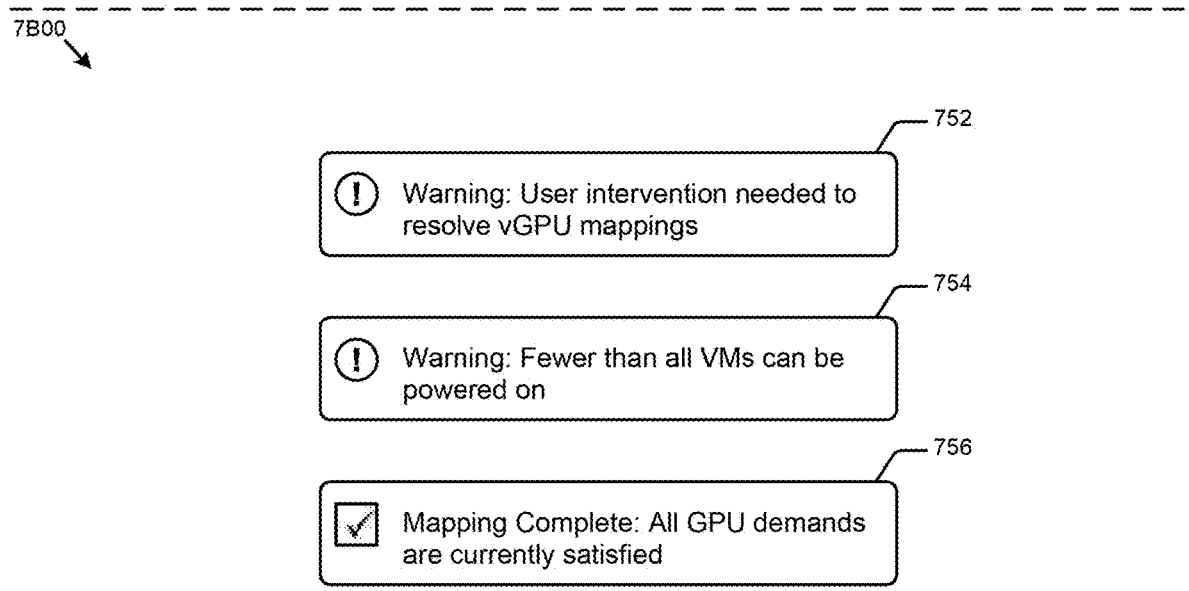
FIG. 7B depicts sample GPU mapping status indicators as used in systems that provide user-influenced reconfigurations of GPUs, according to an embodiment.

FIG. 7B depicts sample GPU mapping status indicators as used in systems that provide user-influenced reconfigurations of GPUs. As an option, one or more variations of GPU mapping status indicators 7B00 or any aspect thereof may be implemented in the context of the architecture and functionality of the embodiments described herein and/or in any environment.

While the processing depicted in FIG. 5B and FIG. 5C is being carried out, whether by operation of the foregoing automation or by operation of a user or admin over a user interface, various indications might be presented to the user in graphical format. Strictly as an example, a warning 752 might be displayed, possibly on multiple screens, in the event that user intervention is needed to resolve mappings. As another example, a more severe warning 754 might be displayed, possibly on multiple screens, in the event that fewer than all of the VMs can be powered on (e.g., because at least one VM cannot be mapped to available GPU resources of the recovery cluster). As yet another example, a success indication 756 might be displayed, possibly on multiple screens, in the event that all GPU demands of all VMs that are to be restarted on the recovery cluster can be satisfied by the available GPU resources of the recovery cluster.

FIG. 7C depicts sample virtual GPU profile options 7C00 as used in systems that provide user-defined reconfigurations of GPUs, according to an embodiment.

There are many possible configurations of a GPU. The shown configurations are merely illustrative. Other configurations involving GPU capabilities in other dimensions are possible. Certain GPU capabilities are provided by the hardware of a GPU, while certain GPU capabilities are provided by a software driver or firmware for or of a particular GPU or type of GPU. As shown, a particular hardware GPU can serve as a host device for many virtual GPUs. In some cases, a particular hardware GPU can support a plurality (e.g., 2, 4, 12, 24, etc.) of the same virtual GPUs (e.g., in accordance with a homogeneous deployment setting). In other cases, a particular hardware GPU can support a plurality of differently configured virtual GPUs (e.g., in accordance with a heterogeneous deployment setting).

System Architecture Overview
Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 8A, FIG. 8B, FIG. 8C, and FIG. 8D.

Figure 8A:
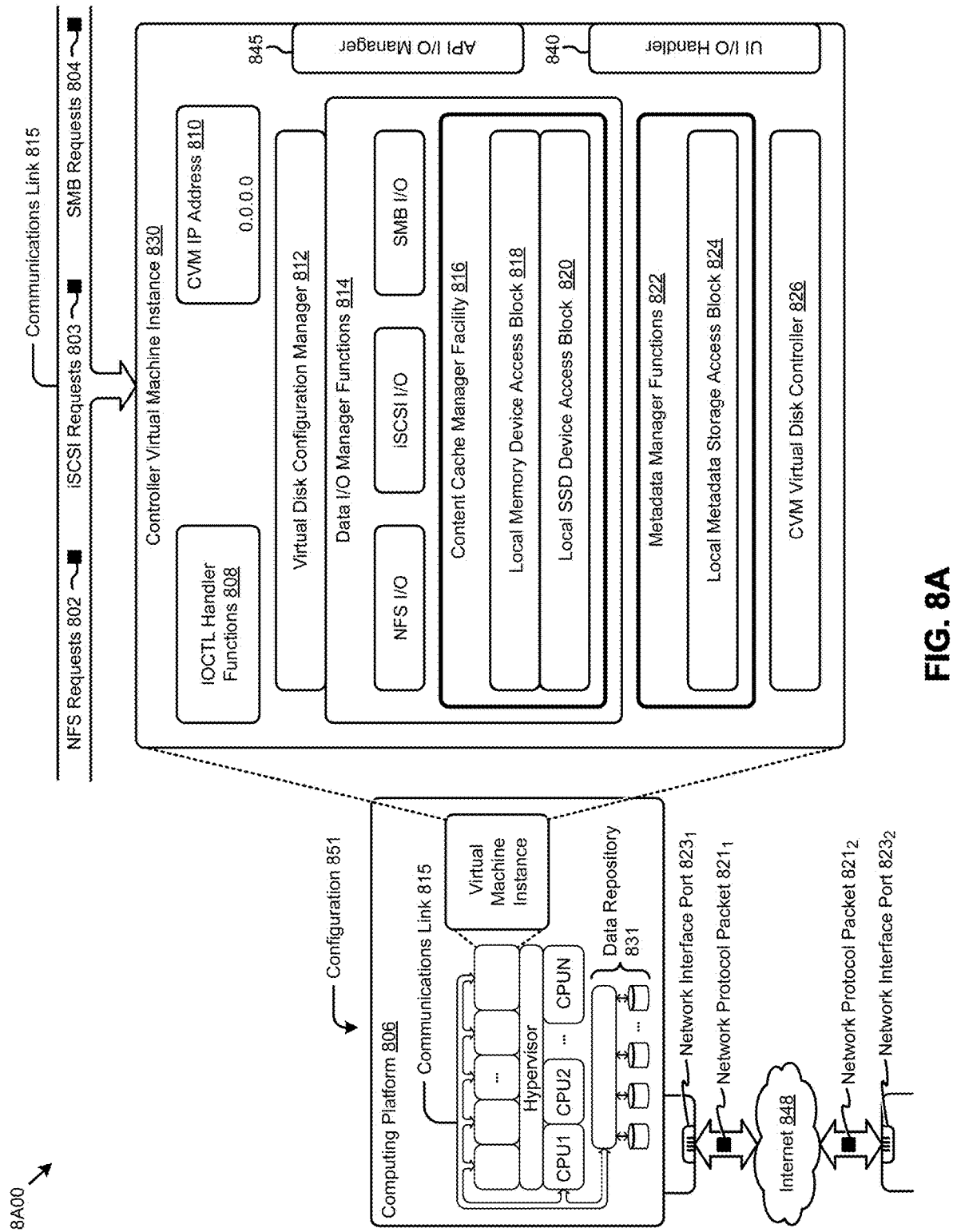
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines are configured for processing of storage inputs or outputs (I/O or JO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer system interface (iSCSI) block JO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more JO control (IOCTL) handler functions (e.g., IOCTL handler functions 808) that interface to other functions such as data JO manager functions 814 and/or metadata manager functions 822. As shown, the data JO manager functions can include communication with virtual disk configuration manager 812 and/or can include direct or indirect communication with any of various block JO functions (e.g., NFS JO, iSCSI IO, SMB IO, etc.).

In addition to block JO functions, configuration 851 supports input or output (JO) of any form (e.g., block JO, streaming JO) and/or packet-based JO such as hypertext transport protocol (HTTP) traffic, etc., through either or both of a user interface (UI) handler such as UI JO handler 840 and/or through any of a range of application programming interfaces (APIs), possibly through API JO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit, or such as any type or instance of a processor (e.g., CPU1, CPU2, . . . , CPUN). According to certain embodiments of the disclosure, two or more instances of configuration 851 can be coupled by communications link 815 (e.g., backplane, local area network, public switched telephone network, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to reconfiguring a replacement graphics processing unit in disaster recovery scenarios. In some embodiments, a module may include one or more state machines and/or combinational logic used to implement or facilitate the operational and/or performance characteristics pertaining to reconfiguring a replacement graphics processing unit in disaster recovery scenarios.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of reconfiguring a replacement graphics processing unit in disaster recovery scenarios). Such files or records can be brought into and/or stored in volatile or non-volatile memory.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
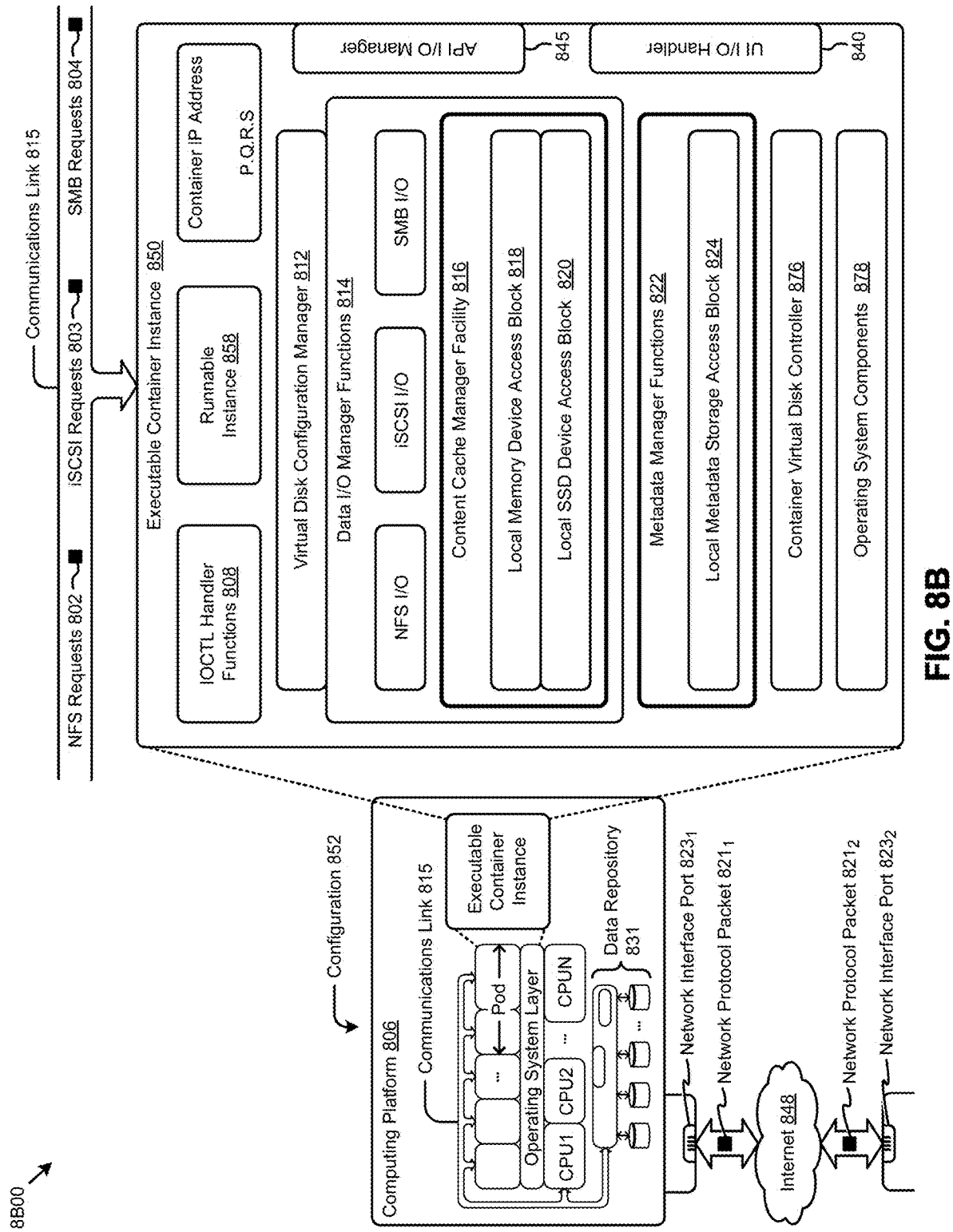

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
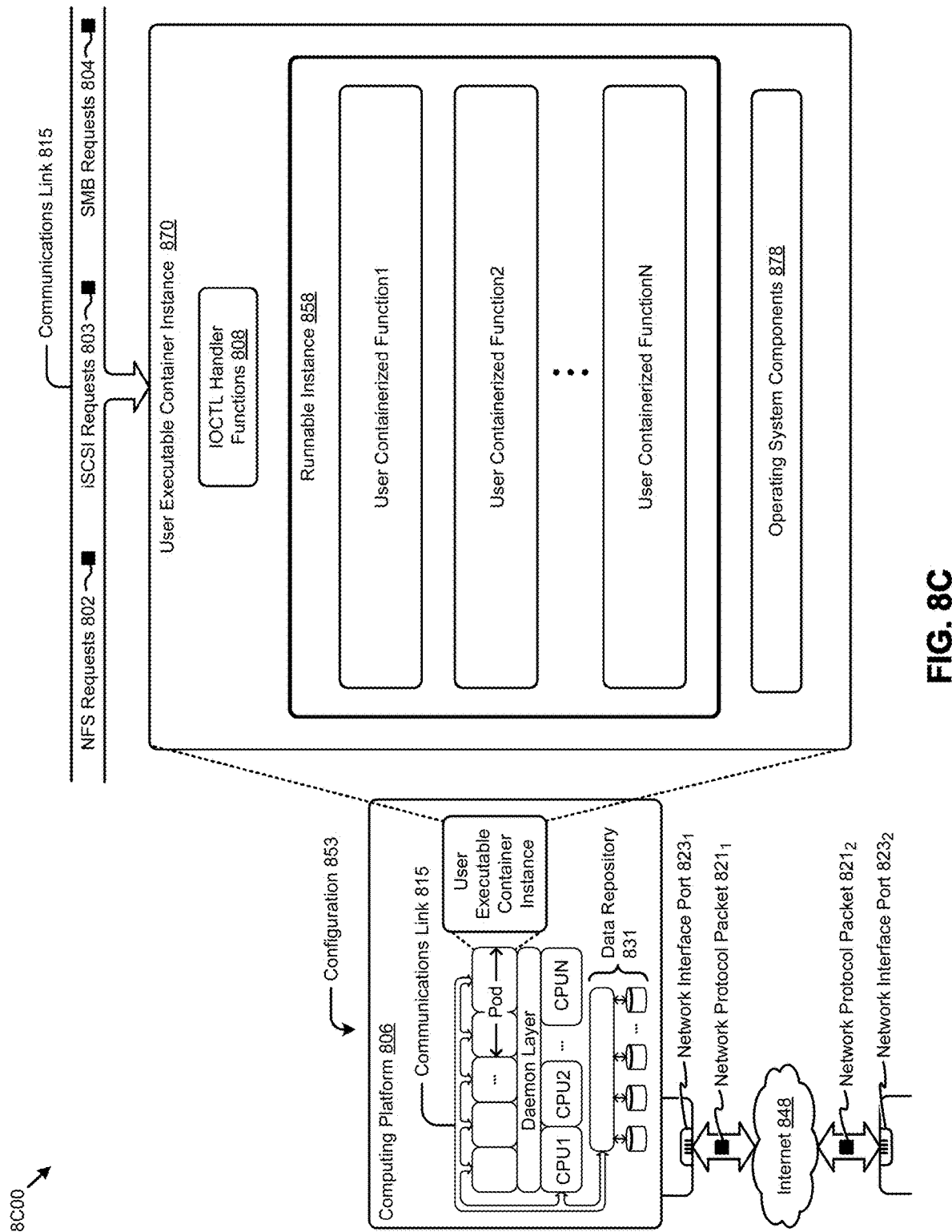

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (NAS) and/or may include all or portions of a storage area network (SAN). Unlike prior approaches, the presently discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
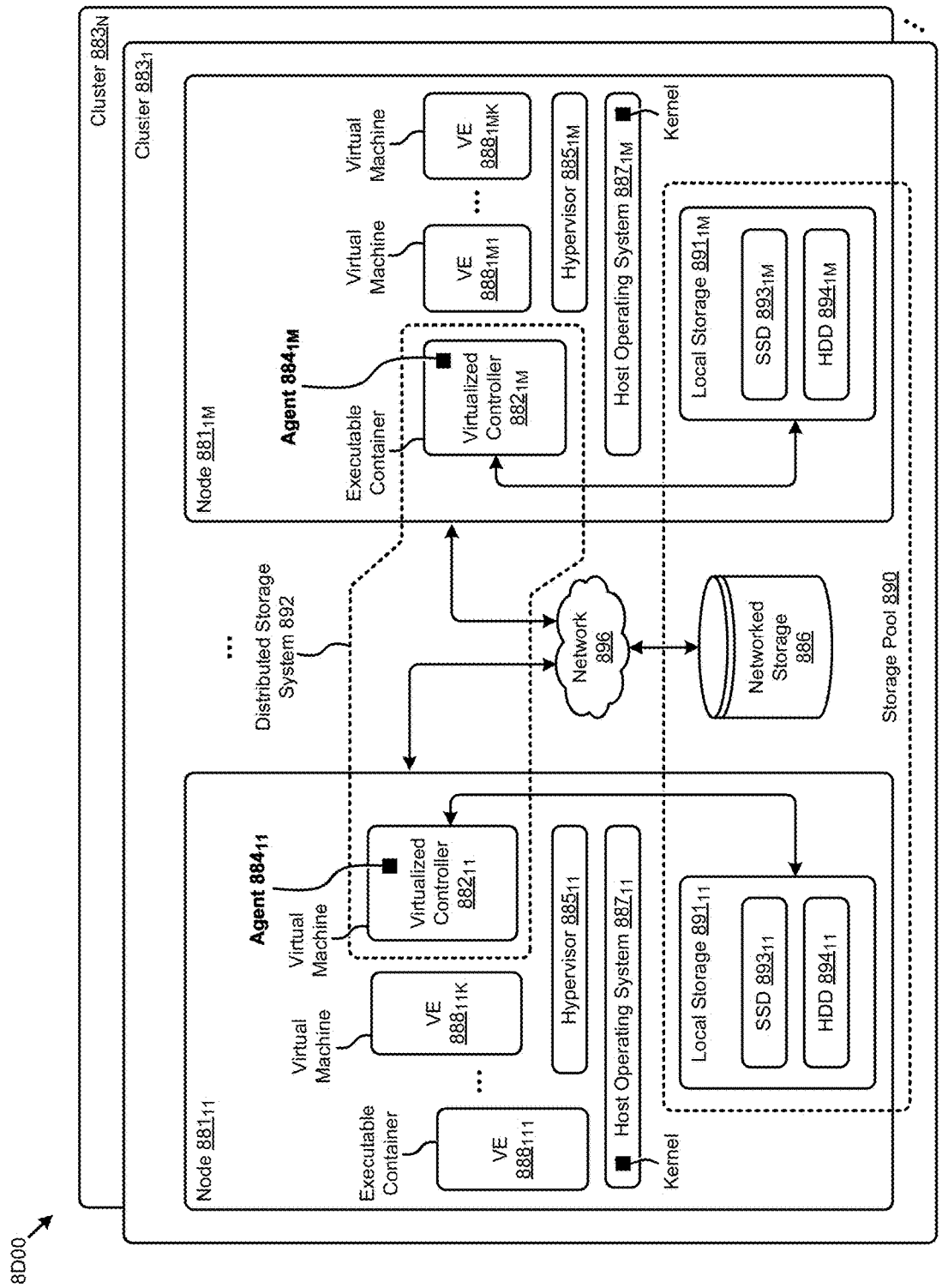

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}, \ldots$, local storage $891_{1M}$). For example, the local storage can be within or directly attached to a server and/or appliance associated with the nodes. Such local storage can include solid state drives (SSD $893_{11}, \ldots$, SSD $893_{1M}$), hard disk drives (HDD $894_{11}, \ldots$, HDD $894_{1M}$), and/or other storage devices.

As shown, any of the nodes of the distributed virtualization system can implement one or more user virtualized entities (VEs) such as the virtualized entity (VE) instances shown as VE $888_{111}, \ldots$, VE $888_{11K}, \ldots$, VE $888_{1M1}, \ldots$, VE $888_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $887_{11}, \ldots$, host operating system $887_{1M}$), while the VMs run multiple applications on various respective guest operating systems. Such flexibility can be facilitated at least in part by a hypervisor (e.g., hypervisor $885_{11}, \ldots$, hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $887_{11}, \ldots$, host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In certain embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to dynamically reconfiguring a replacement graphics processing unit when restarting on a recovery node can be brought to bear through implementation of any one or more of the foregoing techniques. Moreover, any aspect or aspects of providing high availability of a clustered virtualization system even when specialized GPUs are demanded by components of the to-be-restarted virtualization system can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:

executing, on a first node of a computing platform, a first instance of a computing process that is configured to use a first graphics processing unit (GPU) in a first GPU configuration;

detecting a loss of functionality that affects the computing process; and responsive to detecting the loss of functionality, automatically determining that a second instance of the computing process can execute on a second node by:
    determining that the second instance of the computing process can execute using a second GPU in a second GPU configuration on the second node; and
    configuring the second instance of the computing process to use the second GPU in the second GPU configuration on the second node,
    wherein the second GPU configuration is different from the first GPU configuration; and
    wherein an aggregate GPU demand level is assessed for a set of virtual machines or computing processes, and reconfiguring at least some of the set of virtual machines or computing processes to use the second GPU.

2. The non-transitory computer readable medium of claim 1, wherein determining that the computing process can run using a second GPU configuration comprises comparing capabilities of the second GPU with respect to the first GPU configuration.

3. The non-transitory computer readable medium of claim 2, wherein configuring the computing process to use the second GPU involves an upward compatibility from the first GPU configuration to the second GPU configuration.

4. The non-transitory computer readable medium of claim 2, wherein configuring the computing process to use the second GPU involves an downward compatibility from the first GPU configuration to the second GPU configuration.

5. The non-transitory computer readable medium of claim 1, further comprising instructions which, when stored in memory and executed by the processor cause the processor to perform further acts of, probing a cloud-based infrastructure for available GPU configurations.

6. The non-transitory computer readable medium of claim 1, further comprising instructions which, when stored in memory and executed by the processor cause the processor to perform further acts of presenting, on a computer display screen, a graphical user interface (GUI) that depicts at least a portion of the second GPU configuration in the GUI.

7. A method comprising:
    executing, on a first node of a computing cluster, a first instance of a computing process that is configured to use a first graphics processing unit (GPU) in a first GPU configuration;
    detecting a loss of functionality that affects the computing process; and
    responsive to detecting the loss of functionality, automatically determining that a second instance of the computing process can execute on a second node by:
        determining that the second instance of the computing process can execute using a second GPU in a second GPU configuration on the second node; and
        configuring the second instance of the computing process to use the second GPU in the second GPU configuration on the second node,
        wherein the second GPU configuration is different from the first GPU configuration; and
        wherein an aggregate GPU demand level is assessed for a set of virtual machines or computing processes, and reconfiguring at least some of the set of virtual machines or computing processes to use the second GPU.

8. The method of claim 7, wherein determining that the computing process can run using a second GPU configuration comprises comparing capabilities of the second GPU with respect to the first GPU configuration.

9. The method of claim 8, wherein configuring the computing process to use the second GPU involves an upward compatibility from the first GPU configuration to the second GPU configuration.

10. The method of claim 8, wherein configuring the computing process to use the second GPU involves an downward compatibility from the first GPU configuration to the second GPU configuration.

11. The method of claim 7, further comprising, probing a cloud-based infrastructure for available GPU configurations.

12. The method of claim 7, further comprising presenting, on a computer display screen, a graphical user interface (GUI) that depicts at least a portion of the second GPU configuration in the GUI.

13. A system comprising:
    a storage medium having stored thereon a sequence of instructions; and
    a processor that executes the sequence of instructions to cause the processor to perform acts comprising,
        executing, on a first node of a computing platform, a first instance of a computing process that is configured to use a first graphics processing unit (GPU) in a first GPU configuration;
        detecting a loss of functionality that affects the computing process; and
        responsive to detecting the loss of functionality, automatically determining that a second instance of the computing process can execute on a second node by:
            determining that the second instance of the computing process can execute using a second GPU in a second GPU configuration on the second node; and
            configuring the second instance of the computing process to use the second GPU in the second GPU configuration on the second node,
            wherein the second GPU configuration is different from the first GPU configuration; and
            wherein an aggregate GPU demand level is assessed for a set of virtual machines or computing processes, and reconfiguring at least some of the set of virtual machines or computing processes to use the second GPU.

14. The system of claim 13, wherein determining that the computing process can run using a second GPU configuration comprises comparing capabilities of the second GPU with respect to the first GPU configuration.

15. The system of claim 14, wherein configuring the computing process to use the second GPU involves an upward compatibility from the first GPU configuration to the second GPU configuration.

16. The system of claim 14, wherein configuring the computing process to use the second GPU involves an downward compatibility from the first GPU configuration to the second GPU configuration.

17. The system of claim 13, further comprising instructions which, when stored in memory and executed by the processor cause the processor to perform further acts of, probing a cloud-based infrastructure for available GPU configurations.

18. The system of claim 13, further comprising instructions which, when stored in memory and executed by the processor cause the processor to perform further acts of presenting, on a computer display screen, a graphical user interface (GUI) that depicts at least a portion of the second GPU configuration in the GUI.

* * * * *